(12) United States Patent
Li (10) Patent No.: US 7,623,321 B2
(45) Date of Patent: Nov. 24, 2009

(54) MICRO-ACTUATOR INCLUDING ELECTRICAL CONNECTION SHIFTING CIRCUIT, HEAD GIMBAL ASSEMBLY AND DISK DRIVE UNIT WITH THE SAME

(75) Inventor: Hanhui Li, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 353 days.

(21) Appl. No.: 11/593,509

(22) Filed: Nov. 7, 2006

(65) Prior Publication Data

US 2008/0106824 A1    May 8, 2008

(51) Int. Cl.
*G11B 5/56* (2006.01)
(52) U.S. Cl. .................................. 360/294.4; 360/234.5
(58) Field of Classification Search .............. 360/294.4, 360/234.5, 234.6, 294.1, 294.3
See application file for complete search history.

(56) References Cited

U.S. PATENT DOCUMENTS

| 6,943,990 B1 * | 9/2005 | Yokoyama et al. ........ 360/294.4 |
| 7,046,486 B1 * | 5/2006 | Coffey ..................... 360/294.4 |
| 2002/0141117 A1* | 10/2002 | Kasajima et al. ......... 360/294.4 |
| 2004/0095688 A1* | 5/2004 | Shiraishi et al. .......... 360/294.4 |
| 2007/0139823 A1* | 6/2007 | Yao et al. .................. 360/294.4 |

* cited by examiner

*Primary Examiner*—Jefferson Evans
(74) *Attorney, Agent, or Firm*—Nixon & Vanderhye P.C.

(57) ABSTRACT

A micro-actuator for a HGA includes a frame having a pair of side arms and a connection plate that interconnects the two side arms at one end thereof; a PZT element attached to at least one of the side arms; and an electrical connection shifting device to connect with the PZT element and the connection plate physically. The electrical connection shifting device is electrically connected with the PZT element for shifting an electrical connection position of the micro-actuator with a suspension of the HGA from the PZT element to the connection plate. The invention also discloses a HGA and a disk drive unit with the micro-actuator.

13 Claims, 12 Drawing Sheets

MICRO-ACTUATOR INCLUDING ELECTRICAL CONNECTION SHIFTING CIRCUIT, HEAD GIMBAL ASSEMBLY AND DISK DRIVE UNIT WITH THE SAME

FIELD OF THE INVENTION

The present invention relates to information recording disk drive devices and, more particularly to a micro-actuator and a head gimbal assembly (HGA) with the same.

BACKGROUND OF THE INVENTION

One known type of information storage device is a disk drive device that uses magnetic media to store data and a movable read/write head that is positioned over the media to selectively read from or write to the disk.

Figure 1:
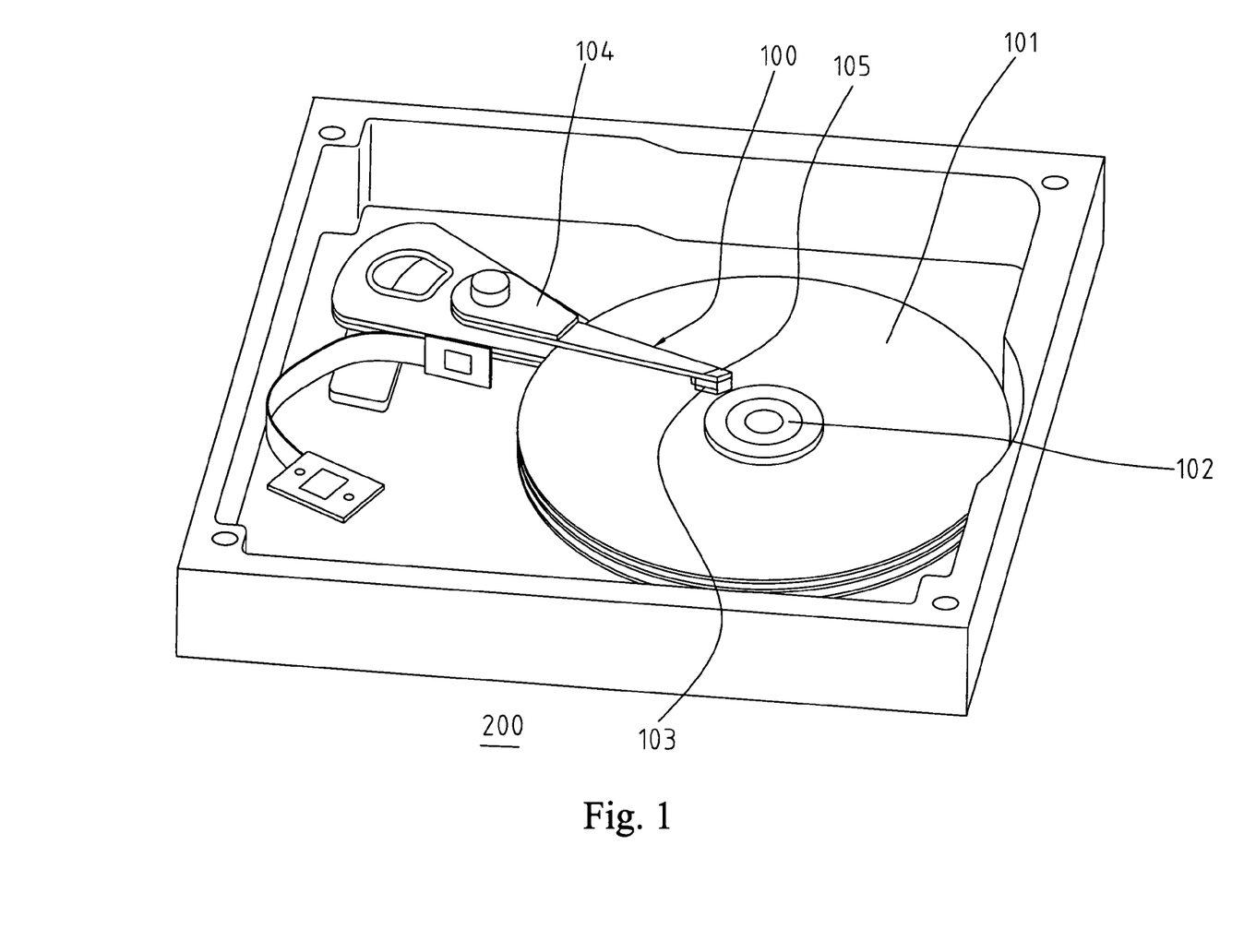
FIG. 1 is a perspective view of a conventional disk drive device.
Figure 2:
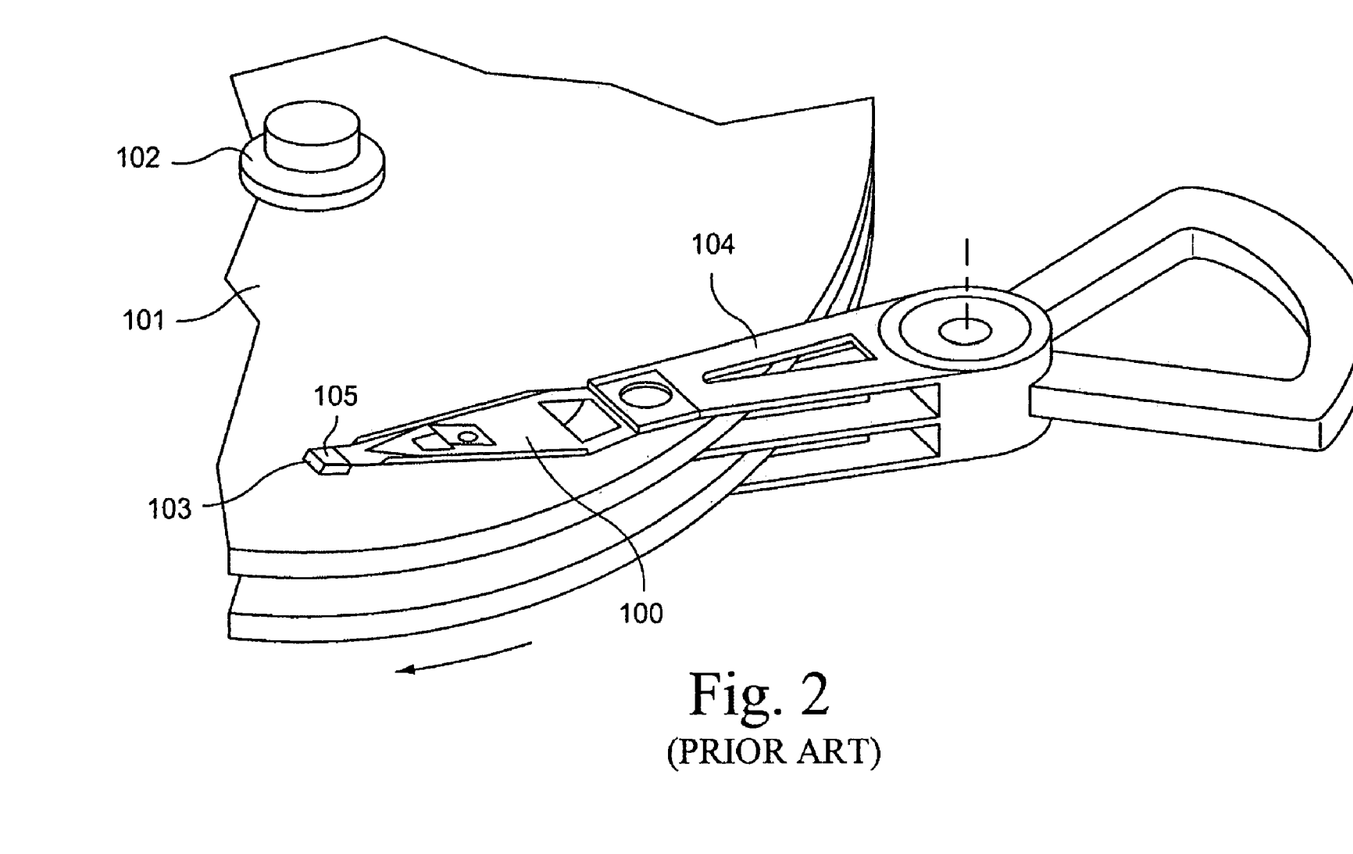
FIG. 2 is a partial perspective view of the conventional disk drive device shown in FIG. 1.

FIGS. 1-2 illustrate a conventional disk drive device 200 and show a magnetic disk 101 mounted on a spindle motor 102 for spinning the disk 101. A voice coil motor arm 104 carries a HGA 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

Figure 3A:
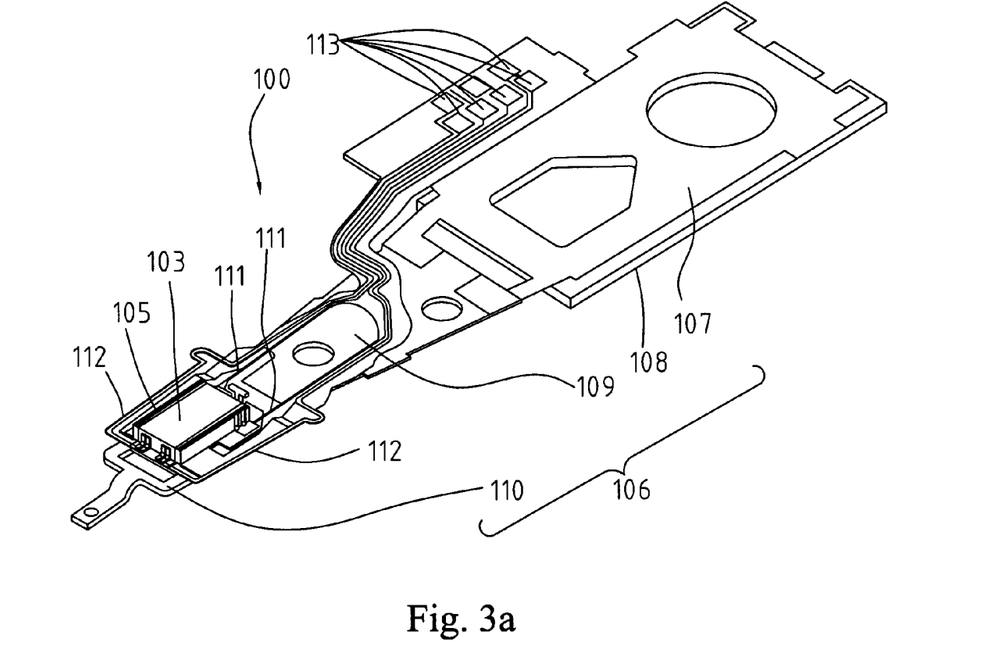
FIG. 3a is a perspective view of a conventional HGA.
Figure 3B:
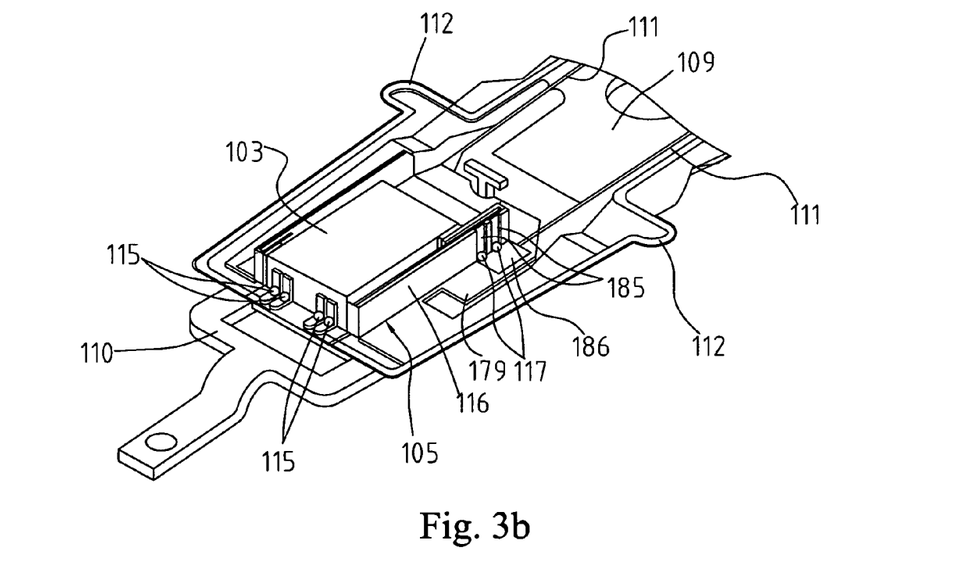

FIGS. 3a-3b illustrate the HGA 100 of the conventional disk drive device of FIGS. 1-2. As illustrated, the HGA 100 includes a suspension 106 comprising a base plate 108, a load beam 110, a flexure 109 and a hinge 107, and all these components are assembled together. The flexure 109 has a suspension tongue 179 formed thereon to load the piezoelectric (PZT) micro-actuator 105 and the slider 103. In addition, inner suspension traces 111 and outer suspension traces 112 are formed on the flexure 109. The suspension traces 111 and 112 have their one ends electrically coupled to the PZT micro-actuator 105 and the slider 103 respectively, while the other ends thereof are electrically connected with a plurality of electric connection pads 113, which is electrically connected with an external control system (not shown) in turn. By the external control system, operation of the PZT micro-actuator 105 and the slider 103 is properly controlled.

Figure 3C:
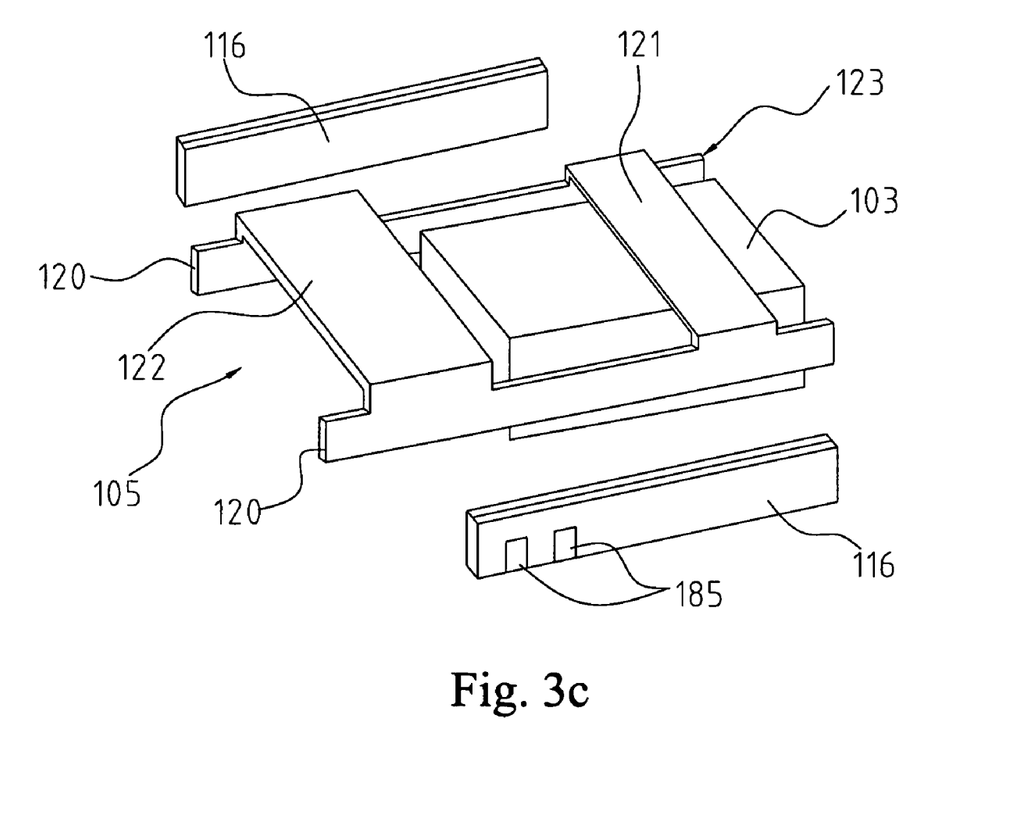
FIG. 3c is an exploded perspective view of a slider and a PZT micro-actuator of the HGA shown in FIG. 3b.

Referring to FIG. 3c, a conventional PZT micro-actuator 105 used in the HGA 100 described above includes a metal frame 123, which has a top support 121 for supporting the slider 103 (referring to FIG. 3a), a bottom support 122 for mounting the whole micro-actuator 105 to the suspension 106 (referring to FIG. 3a), and two side arms 120 that interconnect the two supports 121 and 122. The side arms 120 each have a PZT element 116 attached thereto. Each PZT element 116 has two electrical connection pads 185 formed at one end thereof. The slider 103 is supported on the top support 121 and disposed between the two side arms 120.

As shown in FIGS. 3b-3c, the PZT micro-actuator 105 is physically coupled to the suspension tongue 179 by the bottom support 122. A plurality of electrical connection balls 117 is provided to couple the PZT micro-actuator 105 to the inner suspension traces 111. Namely, an electrical connection pad 186, which is electrically connected to the inner suspension traces 111, is provided on the suspension tongue 179 at a position adjacent the electrical connection pads 185 of each PZT element 116. These pads 185 and 186 are electrically interconnected together by the electrical connection balls 117. In addition, there are four metal balls 115 for coupling the slider 103 to the outer suspension traces 112 for electrical connection of the read/write transducers thereof to the external control system. When power is supplied through the inner suspension traces 111, the PZT elements 116 expand or contract to cause the two side arms 120 to bend in a common lateral direction. The bending causes a shear deformation of the frame 123, which causes movement of the top support 121. This causes movement of the slider 103 connected thereto, thereby making the slider 103 move on the track of the disk in order to fine tune the position of the read/write head.

It is desired that the PZT elements have a big deformation so that the slider can get a stroke value (displacement) as big as possible during operation, thereby improving data reading/writing performance thereof. However, in conventional technology described above, since an electrical connection between the PZT element 116 and the inner suspension traces 111 occurs at one end of the PZT element 116 where the electrical connection pads 185 are formed, the connection results in fixation of this end of the PZT element 116 relative to the inner suspension traces 111 (more concretely, the suspension), i.e., the end becomes undeformable due to restraint of the suspension, thus negatively deteriorating deformability of the whole PZT element 116, and accordingly, making the stroke value of the slider reduced greatly.

Thus, there is a need for an improved micro-actuator that does not suffer from the above-mentioned drawbacks.

SUMMARY OF THE INVENTION

One aspect of the present invention relates to a micro-actuator, which can enhance deformability of the PZT element, thus increasing stroke value of the slider.

Another aspect of the invention relates to a HGA, which can enhance deformability of the PZT element, thus increasing stroke value of the slider.

Another aspect of the invention relates to a disk drive unit, which can enhance deformability of the PZT element, thus increasing stroke value of the slider, and finally improving data reading/writing performance of the whole disk drive unit.

To achieve above objects, a micro-actuator of the present invention comprises a frame comprising a pair of side arms and a connection plate that interconnects the two side arms at one end thereof; a PZT element attached to at least one of the side arms; and an electrical connection shifting device to connect with the PZT element and the connection plate physically. The electrical connection shifting device is electrically connected with the PZT element for shifting an electrical connection position of the micro-actuator with a suspension of the HGA from the PZT element to the connection plate.

The electrical connection shifting device may be any suitable device such as a flexible printed circuit (FPC). The FPC may comprise an insulator layer for electrically isolating the FPC from the connection plate, and a trace circuit layer formed on the insulator layer to electrically connect with the PZT element.

In addition, the frame of the micro-actuator may further comprise a top support plate interconnecting the two side arms at the other end thereof to support a slider thereon. Moreover, a bottom support plate may be provided and coupled to the connection plate for mounting the micro-actuator to the suspension of the HGA. In an embodiment, the bottom support plate may be used to enhance the structural stiffness of the entire micro-actuator.

Furthermore, the electrical connection shifting device is L-shaped, and because the L-shaped electrical connection shifting device can fittingly match with the PZT element and the connection plate together, the assembly of the whole micro-actuator is simplified, and high connecting reliability of the device to both the PZT element and the connection plate is obtained.

A HGA of the present invention comprises a slider; a micro-actuator; and a suspension to support the micro-actuator and the slider. The micro-actuator comprises a frame comprising a pair of side arms and a connection plate that interconnects the two side arms at one end thereof; a PZT element attached to at least one of the side arms; and an electrical connection shifting device to connect with the PZT element and the connection plate physically. The electrical connection shifting device is electrically connected with the PZT element for shifting an electrical connection position of the micro-actuator with a suspension of the HGA from the PZT element to the connection plate.

A disk drive unit of the present invention comprises: a HGA; a drive arm connected to the HGA; a disk; and a spindle motor operable to spin the disk. The HGA comprises: a slider; a micro-actuator; and a suspension to support the micro-actuator and the slider. The micro-actuator comprises: a frame having a pair of side arms and a connection plate that interconnects the two side arms at one end thereof; a PZT element attached to at least one of the side arms; and an electrical connection shifting device to connect with the PZT element and the connection plate physically. The electrical connection shifting device is electrically connected with the PZT element for shifting an electrical connection position of the micro-actuator with a suspension of the HGA from the PZT element to the connection plate.

Compared with conventional technology, since electrical connection between the micro-actuator and the suspension is shifted from the PZT element to a position not interfered with deformation of the PZT element via an electrical connection shifting device, the PZT is entirely free from restraint of the suspension, thus obtaining a bigger deformation for the PZT element, and finally getting a bigger stroke value for a slider.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3b is a partial perspective view of the HGA shown in FIG. 3a;

FIG. 4c is an exploded perspective view of the micro-actuator shown in FIG. 4a;

FIG. 5a is an exploded perspective view of the frame shown in FIG. 4a;

FIG. 6a is a perspective view of a slider and the micro-actuator shown in FIG. 4a;

DETAILED DESCRIPTION OF ILLUSTRATED EMBODIMENTS

Several example embodiments of a micro-actuator for a HGA will now be described. It is noted that the micro-actuator may be implemented in any suitable disk drive device having a micro-actuator in which it is desired to improve slider stroke performance, regardless of the specific structure of the HGA as illustrated in the figures. That is, the invention may be used in any suitable device having a micro-actuator in any industry.

FIGS. 4a-7c illustrate a micro-actuator 205 according to an embodiment of the invention. As illustrated, the micro-actuator 205 comprises a frame 223; a pair of PZT elements 216 mounted to the frame 223 and a pair of FPCs 230 to electrically connect the PZT elements 216 to a suspension of a HGA respectively (will be described later).

Figure 5A:
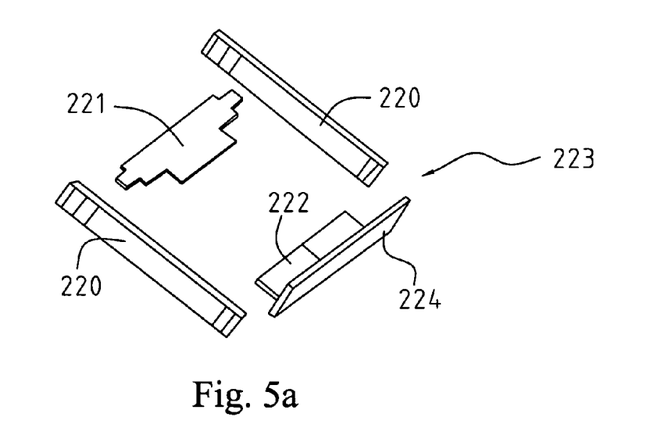
Figure 5B:
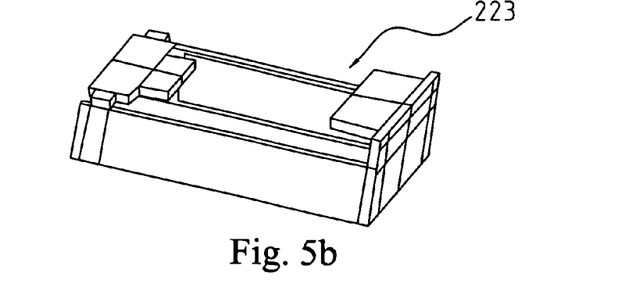
FIG. 5b is a perspective view of the frame shown in FIG. 4a viewed from a bottom position.

As best shown in FIGS. 5a-5b, the frame 223 comprises a pair of side arms 220, a top support plate 221 that interconnects the two side arms 220 at one end thereof, a connection plate 224 that interconnects the two side arms 220 at the other end thereof, and a bottom support plate 222 coupled to the connection plate 224. The top support plate 221 is used to support a slider thereon. The bottom support plate 222 is disposed between the two side arms 220 and is used to mount the whole micro-actuator 205 to a suspension of a HGA. The frame 223 may be constructed of any suitable material, e.g., metal, preferably stainless steel, and may be constructed using any suitable process.

Each PZT element 216 is attached on respective side arm 220 of the frame 223 by suitable manner such as adhesive. Two electrical connection pads 217 are provided on each PZT element 216 to electrically connect the PZT element 216 to an outer control system (not shown). In addition, the PZT element 216 may be e.g., laminated thin films consisting of piezoelectric material such as PZT and Ni—Ag or Pt or gold metal as electrode, or a ceramic PZT with a single layer or a multi-layer.

Figure 4A:
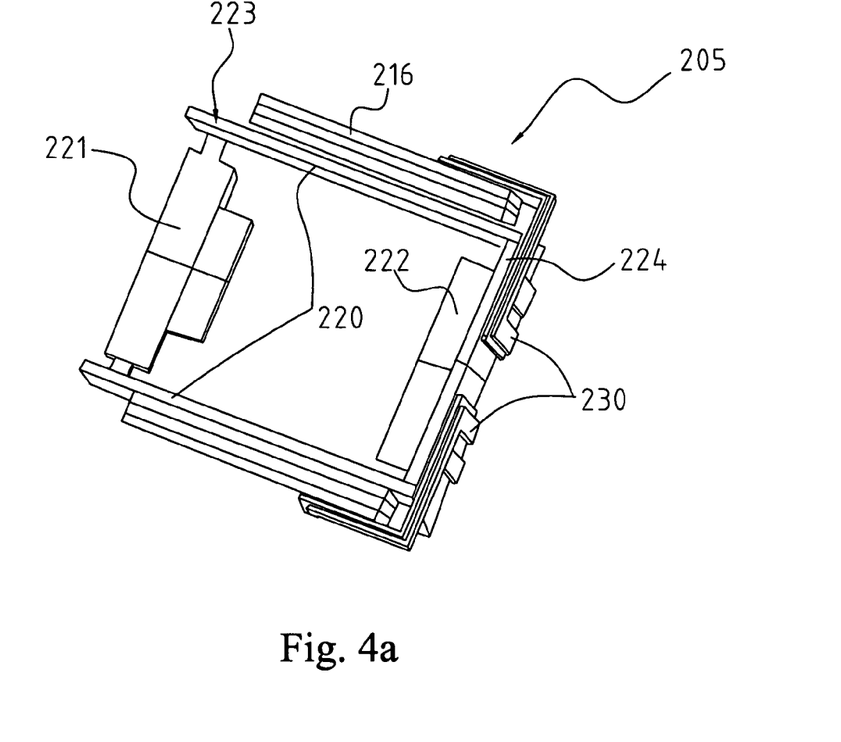
FIG. 4a is a perspective view of a micro-actuator according to an embodiment of the invention.
Figure 4B:
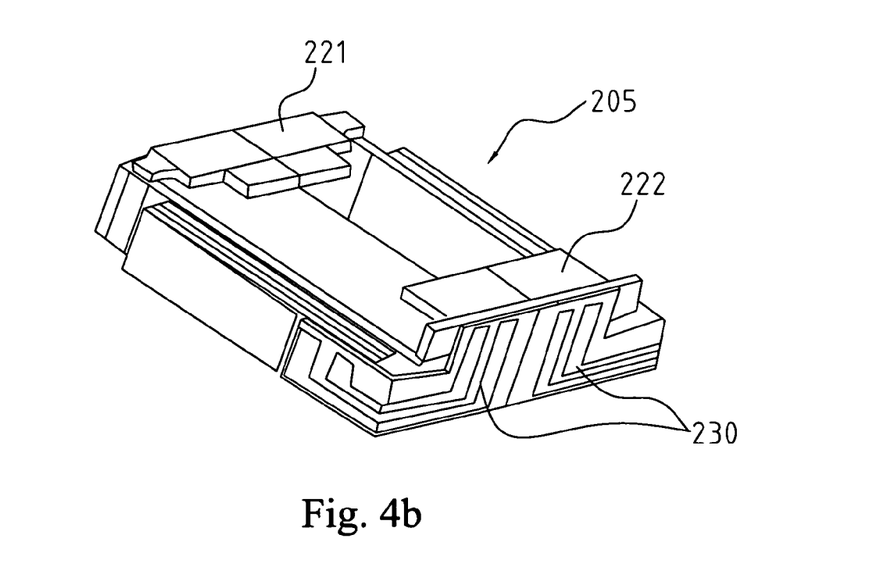
FIG. 4b is a perspective view of the micro-actuator shown in FIG. 4a while viewed from a different angle.
Figure 4C:
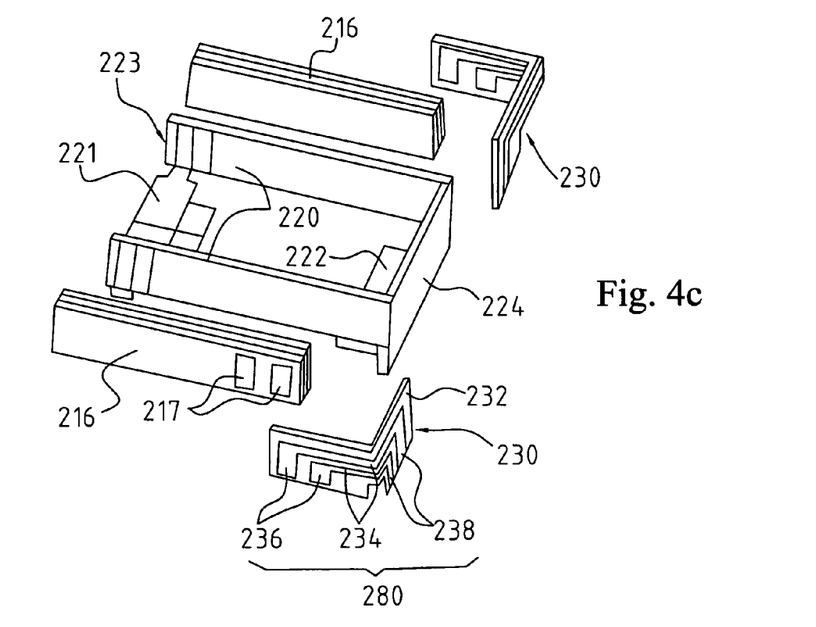

Each FPC 230 comprises an insulator layer 232 and a trace circuit layer 280 laminated with the insulator layer 232. The trace circuit layer 280 comprises a pair of trace circuits 234. Each trace circuit 234 has a first end 236 corresponding to respective electrical connection pad 217 and a second end 238. When assembled, the entire FPC 230 is in a bending state and is attached on both the PZT element 216 and the connection plate 224 such that the first ends 236 of the FPCs 230 are electrically coupled to the electrical connection pads 217 respectively, while the second ends 238 thereof are disposed on the connection plate 224. In this embodiment, each first end 236 of the FPC 230 is attached on an outer surface of respective PZT element 216.

The insulator layer 232 functions to insulate the trace circuit layer 234 from the metal frame 223, thus avoiding electrical short between the trace circuit layer 234 and the metal frame 223. Notably, the first ends 236 are not covered by the insulator layer 232, and therefore not insulated by the insulator layer 232, so that they can be electrically coupled with the connection pads 217 of the PZT element 216.

Here, the FPC 230 is provided to change electrical connection position of the PZT element 216 from its one end, where the electrical connection pads 217 are formed, to another position not interfered with deformation of the PZT element 216, i.e., a position at the connection plate 224 of the frame 223, such that the PZT element 216 can deform more effectively.

Figure 6A:
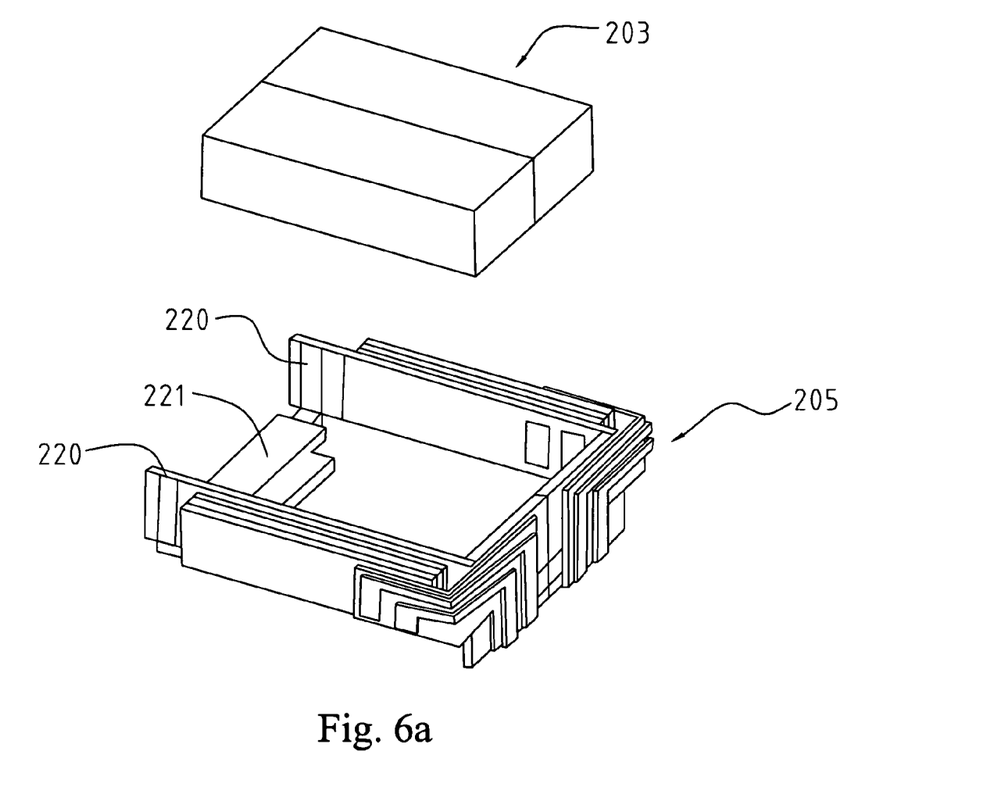
Figure 6B:
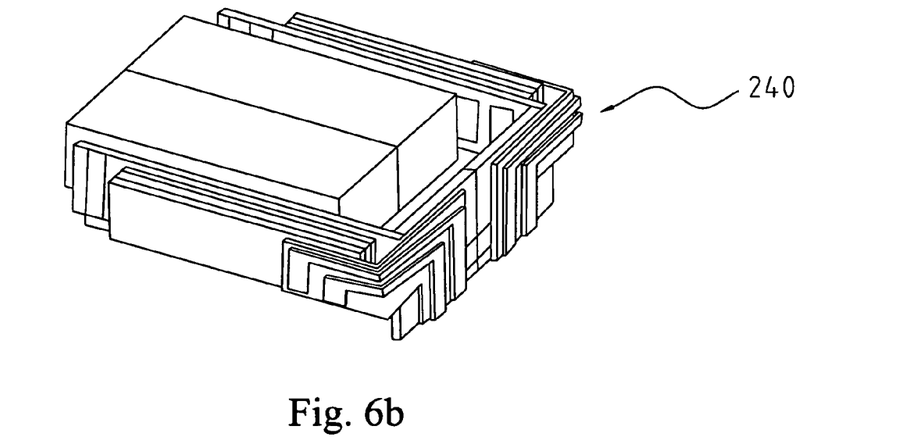
FIG. 6b is a perspective view of a combination of the slider and the micro-actuator of FIG. 6a in an assembled state.
Figure 6C:
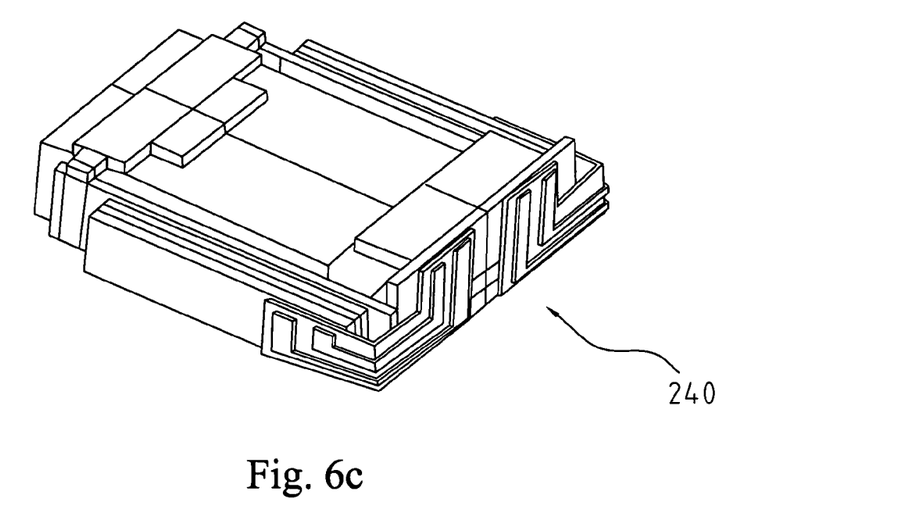
FIG. 6c is another perspective view of the combination of FIG. 6b.

Referring now to FIGS. 6a-6c, a slider 203 is mounted on the top support plate 221 of the frame 223 of the micro-actuator 205, and disposed between the two side arms 220, thus forming a combination 240. Then, referring to FIGS. 7a-7c, the combination 240 is assembled to a suspension 213 to form a HGA 300.

Figure 7A:
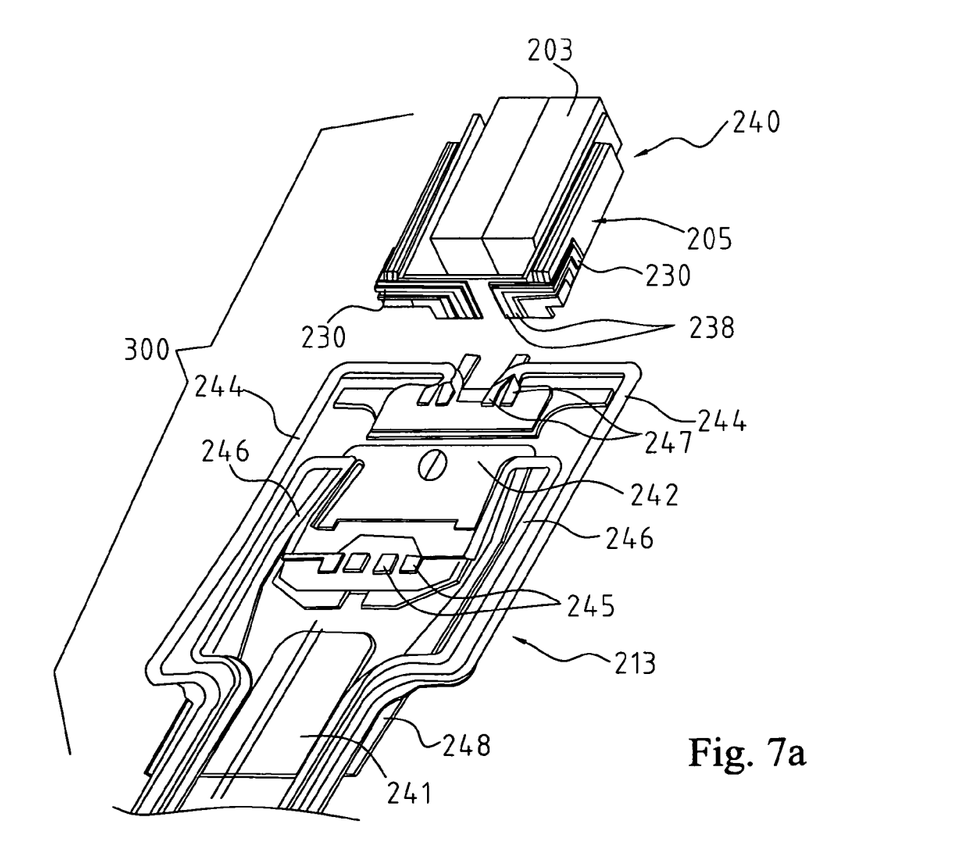
FIG. 7a is a partial, exploded, perspective view of a HGA incorporating the combination of FIG. 6b.
Figure 7B:
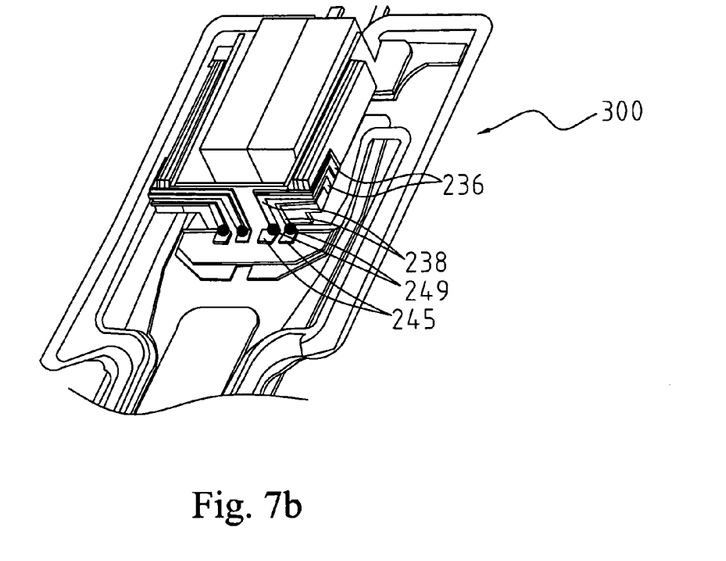
FIG. 7b is a partial perspective view of the HGA of FIG. 7a in an assembled state.
Figure 7C:
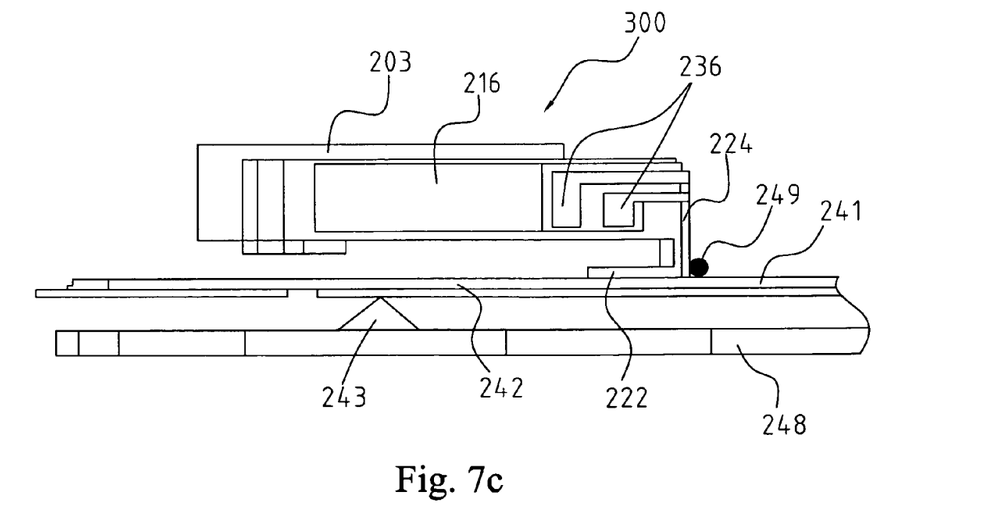
FIG. 7c is a partial side view of the HGA of FIG. 7b.

More specifically, the suspension 213 comprises a flexure 241 to support the combination 240 and a load beam 248 to support the flexure 241. The flexure 241 has a suspension tongue 242 formed thereon. A plurality of electrical connection pads 245, for example four pads is formed on the suspension tongue 242. In addition, a plurality of outer suspension traces 244 is provided on outer periphery of the flexure 241. One end of the outer suspension traces 244 is electrically connected with several electrical connection pads 247, for example four pads. The flexure 241 further comprises a plurality of inner suspension traces 246 electrically connected with the plurality of the pads 245 respectively. The load beam 248 has a dimple 243 formed thereon to transfer load force to the slider 203.

The combination 240 is assembled on the suspension tongue 242 of the flexure 241. The slider 203 is electrically connected with the outer suspension traces 244 via the connection pads 247, so that it can be controlled by an external control system (not shown). In addition, the second ends 238 of the FPCs 230 of the micro-actuator 205 are electrically connected with connection pads 245 of the flexure 214 by a plurality of electrical connection balls (gold ball bonding or solder ball bonding, GBB or SBB) 249. By this electrical connection, the micro-actuator 205 is controlled by the external control system via the inner suspension traces 246.

Compared with the conventional technology where electrical connection between the PZT element and the suspension occurs at one end of the PZT element, the electrical connection between the PZT element and the suspension is shifted from the PZT element to a position not interfered with deformation of the PZT element via an electrical connection shifting device for example the FPC 230 described above. Namely, the electrical connection is shifted to a position on a connection plate of a frame of a micro-actuator, and resultantly, the PZT element is entirely free from restraint of the suspension, thus making the PZT element deform more sufficiently, and finally getting larger stroke value for the slider.

In a preferred embodiment of the invention, the electrical connection shifting device is L-shaped. This L-shaped electrical connection shifting device can fittingly match with the PZT element and the connection plate together, the assembly of the whole micro-actuator is simplified, and a high connecting reliability of the device to both the PZT element and the connection plate is obtained.

Figure 8A:
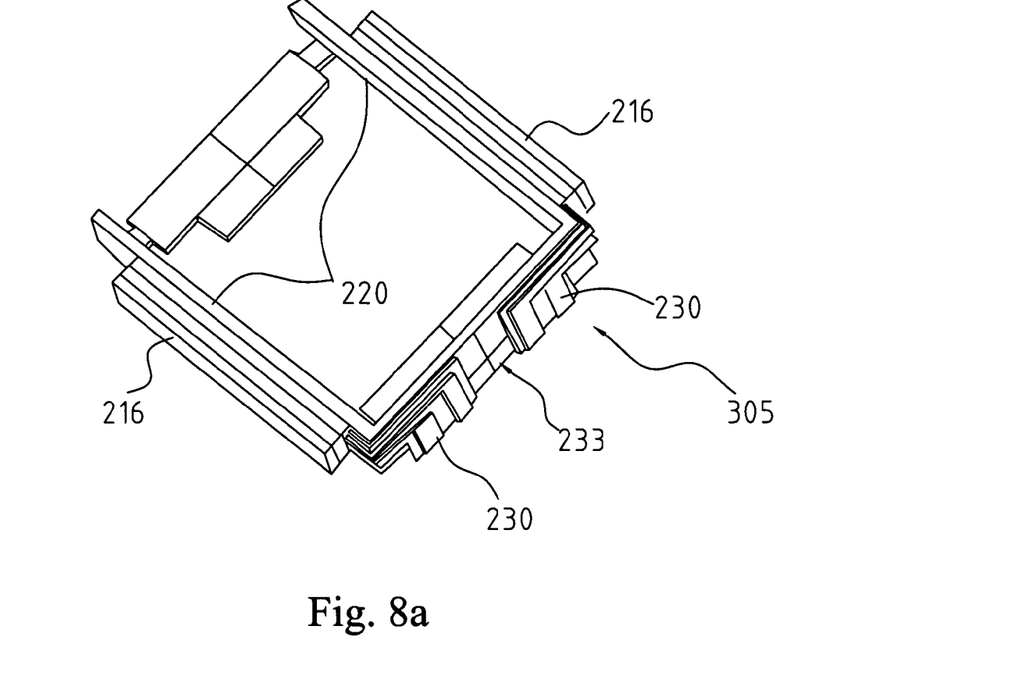
FIG. 8a is a perspective view of a micro-actuator according to another embodiment of the invention.

FIGS. 8a-8e show various embodiments of the micro-actuator. FIG. 8a shows a micro-actuator 305. The micro-actuator 305 is similar to the micro-actuator 205 as described above and illustrated in FIGS. 4a-7c, and the only difference lies in: in this embodiment, each FPC 230 is partially sandwiched between the PZT element 216 and respective side arm 220. In other words, each first end of the FPC 230 (not shown) is attached on an inner surface of respective PZT element 216. Correspondingly, the electrical connection pads of the PZT element 216 will be inwardly faced so that they can be conveniently connected with the first ends of the FPC 230. This type of micro-actuator can obtain a similar effect of improving slider stroke value to the micro-actuator 205.

Figure 8B:
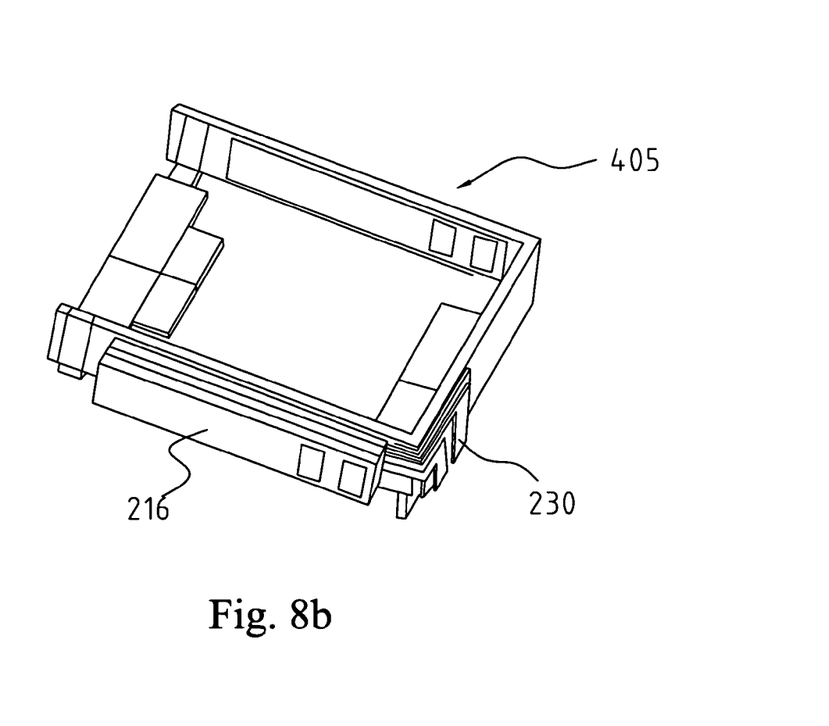
FIG. 8b is a perspective view of a micro-actuator according to a further embodiment of the invention.

FIG. 8b shows another embodiment of a micro-actuator 405. Compared with the micro-actuator 305, only one PZT element 216 is attached on a side arm (not labeled) of the micro-actuator 405, and correspondingly, only one FPC 230 is employed to electrically connect the PZT element to the suspension (as that shown in FIGS. 7a-7c). Similarly, this type of micro-actuator can obtain similar effect of improving slider stroke value as the micro-actuator 205.

Figures 8C, 8D:
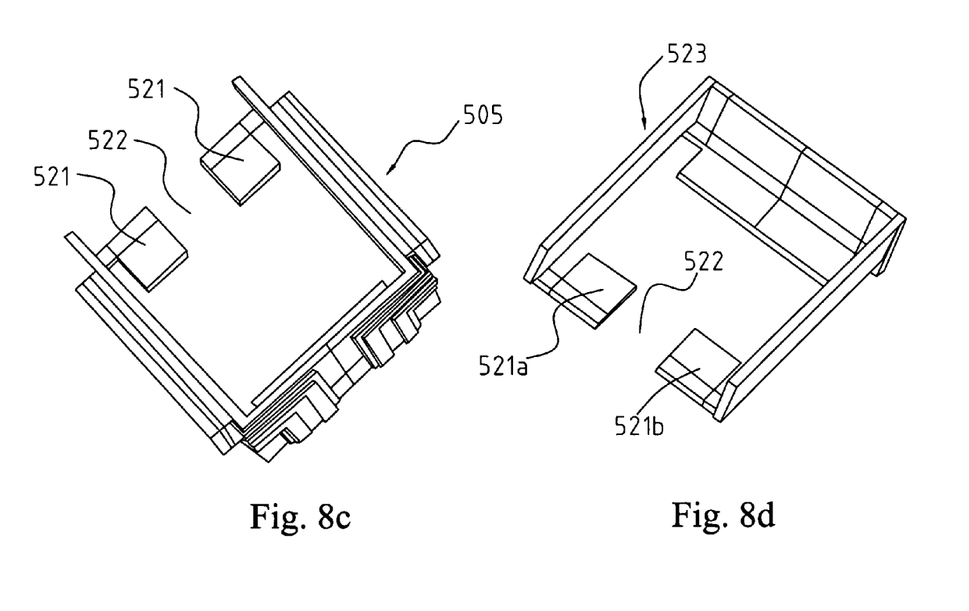
FIG. 8c is a perspective view of a micro-actuator according to yet another embodiment of the invention.
FIG. 8d is a perspective view of a frame of the micro-actuator shown in FIG. 8c.

FIGS. 8c-8d shows a micro-actuator 505 having a frame 523. The micro-actuator 505 is similar to the micro-actuator 305 shown in FIG. 8a. The difference is as follows: the top support plate 521 is divided into two parts 521a and 521b by forming a gap 522 therebetween. This gap 522 helps reduce manufacture cost of the whole frame 253 and reduce whole weight of the micro-actuator 505.

Figure 8E:
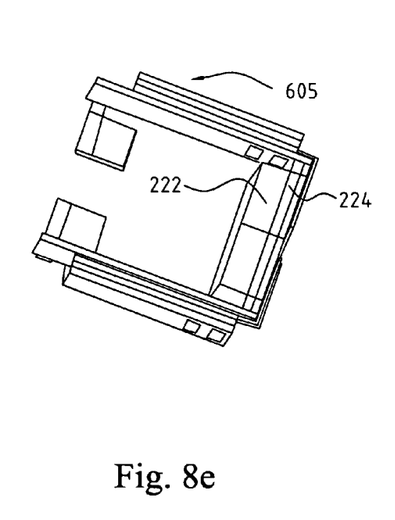
FIG. 8e is a perspective view of a micro-actuator according to another embodiment of the invention.

Referring to FIG. 8e, a micro-actuator 605 according to another embodiment of the invention is shown. The micro-actuator 605 is similar to the micro-actuator 505, and the difference is that the bottom support plate 222 has the same height as that of the connection plate 224. This bottom support plate of sufficient height enhances the structural stiffness of the entire micro-actuator 605.

Figure 8F:
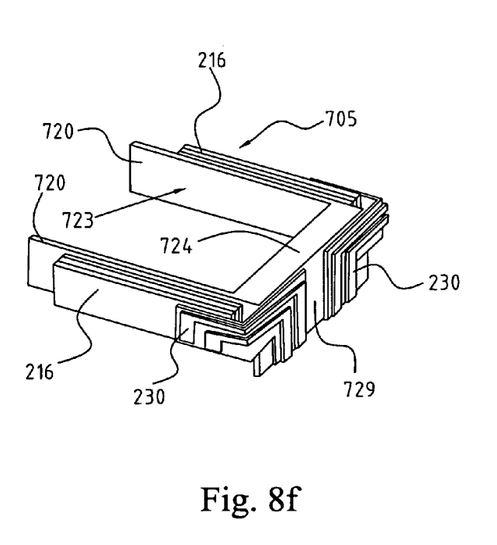
FIG. 8f is a perspective view of a micro-actuator according to another embodiment of the invention.

FIG. 8f shows another type of micro-actuator. As illustrated, the micro-actuator 705 comprises a U-shaped frame 723, a pair of PZT elements 216 attached on the frame 723 and two FPCs 230 positioned on the frame 723 and the PZT element 216 respectively. The frame 723 has two side arms 720 and a connection plate 724 that interconnects the two side arms 720 at one end thereof. The PZT elements 216 are attached on the side arms 720 respectively. The connection plate 724 has a sidewall 729 facing outwardly. Each FPC 230 is disposed on both the PZT element 216 and the sidewall 729 of the connection plate 724 respectively. In this embodiment, a slider may be disposed between the two side arms 720 and secured therebetween.

Like the micro-actuator 205, the micro-actuator 305, 405, 505, 605 or 705 may also be individually assembled to a suspension such as that shown in FIGS. 7a-7c to form a HGA, and in this case, similar advantage of slider stroke value improvement may be achieved. Here, description about the assembly thereof is omitted for clarity.

Figure 9:
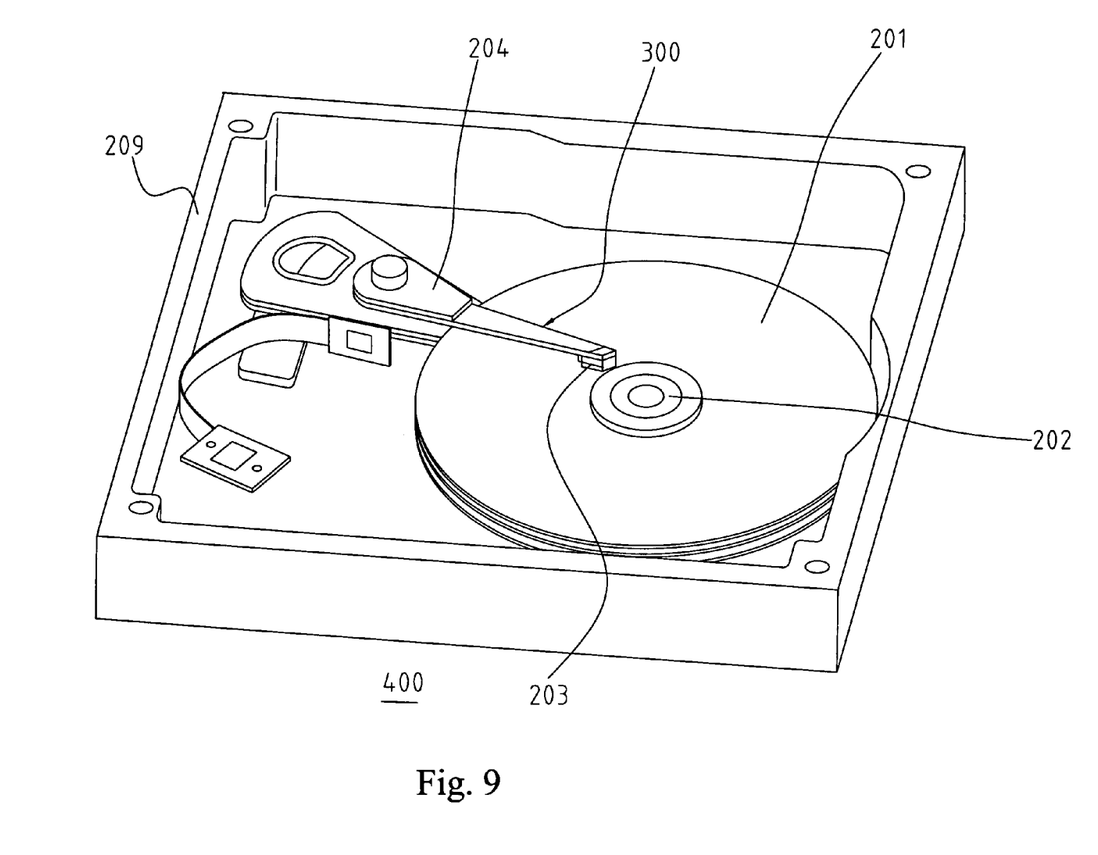
FIG. 9 is a perspective view of a disk drive unit having a micro-actuator according to an embodiment of the invention.

Referring to FIG. 9, according to an embodiment of the invention, a disk drive unit 400 comprises the HGA 300 incorporating the micro-actuator 205, 305, 405, 505 or 605; a drive arm 204 connected to the HGA 300; a disk 201; a spindle motor 202 operable to spin the disk 201 and an enclosure 209 to contain all above components therein. Because the structure, operation and assembly processes of disk drive units are well known to persons of ordinary skill in the art, further details regarding the disk drive unit are not provided herein so as not to obscure the invention.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
    a frame comprising a pair of side arms and a connection plate that interconnects the two side arms at one end thereof;
    a piezoelectric element attached to at least one of the side arms; and
    an electrical connection shifting circuit to connect with the piezoelectric element and the connection plate physically; wherein
    the electrical connection shifting circuit has one end thereof electrically and physically connected with the piezoelectric element and the other end thereof extending along the frame from the piezoelectric element and terminated at the connection plate and configured to electrically and physically connect with a suspension for shifting an electrical connection position of the micro-actuator with the suspension of the head gimbal assembly from the piezoelectric element to the connection plate.

2. The micro-actuator according to claim 1, wherein the electrical connection shifting circuit is a flexible printed circuit.

3. The micro-actuator according to claim 2, wherein the flexible printed circuit comprises an insulator layer for electrically isolating the flexible printed circuit from the connection plate, and a trace circuit layer formed on the insulator layer to electrically connect with the piezoelectric element.

4. The micro-actuator according to claim 1, wherein the electrical connection shifting circuit is L-shaped.

5. The micro-actuator according to claim 1, wherein the electrical connection shifting circuit is exclusively confined to locations at least partially surrounding the frame and on the connection plate adjacent to the frame.

6. A head gimbal assembly, comprising:
    a slider;
    a micro-actuator; and
    a suspension to hold the micro-actuator and the slider; wherein the micro-actuator comprising:
        a frame comprising a pair of side arms and a connection plate that interconnects the two side arms at one end thereof;
        a piezoelectric element attached to at least one of the side arms; and
        an electrical connection shifting circuit to connect with the piezoelectric element and the connection plate physically; wherein
        a plurality of connection pads are disposed on the suspension at positions adjacent to the connection plate;
        the electrical connection shifting circuit has one end thereof electrically and physically connected with the piezoelectric element and the other end thereof extending along the frame from the piezoelectric element and terminated at the connection plate to electrically and physically connect with the connection pads of the suspension, thereby shifting an electrical connection position of the micro-actuator with the suspension of the head gimbal assembly from the piezoelectric element to the connection plate.

7. The head gimbal assembly according to claim 6, wherein the electrical connection shifting circuit is a flexible printed circuit.

8. The head gimbal assembly according to claim 7, wherein the flexible printed circuit comprises an insulator layer for electrically isolating the flexible printed circuit from the connection plate, and a trace circuit layer formed on the insulator layer to electrically connect with the piezoelectric element.

9. The head gimbal assembly according to claim 6, wherein the electrical connection shifting circuit is L-shaped.

10. The head gimbal assembly according to claim 6, wherein the electrical connection shifting circuit is exclusively confined to locations at least partially surrounding the frame and on the connection plate adjacent to the frame.

11. A disk drive unit comprising:
    a head gimbal assembly;
    a drive arm connected to the head gimbal assembly;
    a disk; and
    a spindle motor operable to spin the disk; wherein
    the head gimbal assembly includes:
        a slider;
        a micro-actuator; and
        a suspension to support the micro-actuator and the slider; wherein the micro-actuator comprises:
        a frame comprising a pair of side arms and a connection plate that interconnects the two side arms at one end thereof;
        a piezoelectric element attached to at least one of the side arms; and
        an electrical connection shifting circuit to connect with the piezoelectric element and the connection plate physically; wherein:
        a plurality of connection pads are disposed on the suspension at positions adjacent to the connection plate;
        the electrical connection shifting circuit has one end thereof that is electrically and physically connected with the piezoelectric element and the other end thereof extending along the frame from the piezoelectric element and terminated at the connection plate to electrically and physically connect with the connection pads of the suspension, thereby shifting an electrical connection position of the micro-actuator with the suspension of the head gimbal assembly from the piezoelectric element to the connection plate.

12. The disk drive unit according to claim 11, wherein the electrical connection shifting circuit is a flexible printed circuit.

13. The disk drive unit according to claim 11, wherein the electrical connection shifting circuit is exclusively confined to locations at least partially surrounding the frame and on the connection plate adjacent to the frame.

* * * * *